United States Patent [19]

Castillon et al.

[11] Patent Number: 5,415,775
[45] Date of Patent: May 16, 1995

[54] MONOLITHIC CERAMIC SUPPORTS FOR FILTRATION MEMBRANES

[75] Inventors: Roger Castillon, Lyons; Jean-Paul Laveniere, Neuilly/Sur/Seine, both of France

[73] Assignee: Techsep, Courbevoie Cedex, France

[21] Appl. No.: 95,680

[22] Filed: Jul. 26, 1993

[30] Foreign Application Priority Data

Jul. 24, 1992 [FR] France ................... 92 09138

[51] Int. Cl.⁶ .............................. B01D 71/02
[52] U.S. Cl. .................... 210/490; 210/496; 210/500.25; 210/500.26
[58] Field of Search ............ 210/500.25, 500.26, 210/510.1, 496, 490

[56] References Cited

U.S. PATENT DOCUMENTS

| | | | |
|---|---|---|---|
| 4,814,202 | 3/1989 | Castelas | 427/226 |
| 4,971,696 | 11/1990 | Abe et al. | 210/500.25 |
| 4,981,590 | 1/1991 | Veen et al. | 210/500.25 X |

FOREIGN PATENT DOCUMENTS

| | | |
|---|---|---|
| 0470340 | 2/1992 | European Pat. Off. |
| 0471910 | 2/1992 | European Pat. Off. |
| 2130823 | 11/1972 | France |
| 2587026 | 3/1987 | France |
| 3737839 | 9/1988 | Germany |

OTHER PUBLICATIONS

Patent Abstracts of Japan, vol. 14, No. 406 (C-754), Sep. 4, 1990, JP-A-21 53 871 (NGK Insulators Ltd), Jun. 13, 1990.
Database WPIL, Sec. CH, Week 3090, Derwent Publications Ltd., London, GB; Class J01, AN 90-226867.
Database WPI, Section Ch, Week 7937, Derwent Publications, Ltd., London, GB; Class L02, AN 79-66731B, JP-A-54 096 509 (Matsushita Elec. Ind. K.K.), Jul. 31, 1979.

*Primary Examiner*—Frank Spear
*Attorney, Agent, or Firm*—Burns, Doane, Swecker & Mathis

[57] ABSTRACT

Porous monolithic ceramic support substrates, well suited for consolidating inorganic filtration membranes thereto, e.g., micro/ultrafiltration membranes, to provide composite inorganic micro/ultrafiltration devices, have a mean equivalent pore diameter Ds ranging from 1 to 20 μm and a pore volume greater than 30%, and comprise ceramic alumina particulates at least partially coated with $TiO_2$ particles, wherein the percentage by weight of $TiO_2$, with respect to the total weight of $Al_2O_3$ plus $TiO_2$, ranges from 1% to 75%.

26 Claims, No Drawings

MONOLITHIC CERAMIC SUPPORTS FOR FILTRATION MEMBRANES

BACKGROUND OF THE INVENTION

1. Field of the Invention

The present invention relates to monolithic ceramic supports for inorganic filtration membranes and to the composite filtration devices, per se, produced therefrom.

2. Description of the Prior Art

Because of their particularly attractive separation properties, filtration membranes are being increasingly used in separative techniques in a wide variety of technical fields, for example those relating to agricultural produce, biotechnology, treatment of industrial and drinking waters, the pharmaceutical industry, the nuclear industry, etc.

This development is substantial in the fields of tangential ultrafiltration (diameter of the pores of the membrane ranging from approximately 1 to 200 nm) and of tangential microfiltration (pore diameter ranging from approximately 0.1 to 5 $\mu$m).

In tangential filtration techniques, the fluid to be treated is conveyed parallel to the membrane.

The first membranes used were organic membranes, which were increasingly replaced by inorganic membranes.

Inorganic membranes shaped from ceramic materials present specific advantages with respect to organic membranes. Indeed, inorganic membranes, as a result of their high mechanical strength and of their chemical, biological and thermal inertness, have a very long useful life and can be used under extreme conditions of pH, temperature, pressure, radiation, and the like.

Two parameters are particularly significant for characterizing inorganic membranes. These are the exchange surface area of the membrane per unit of volume, which permits evaluation of its more or less compact nature (compactness of the membrane), and the permeability factor.

It is apparent that the exchange surface area per unit of volume expressed in $m^2/m^3$ must be the highest possible. A flat membrane, provided it is wound into a spiral, has a greater compactness than a tubular membrane.

However, when the diameter of the membrane decreases until it becomes what is designated a hollow fiber, the compactness obtained is then markedly greater than that of flat membranes. Nonetheless, if it is very easy to assemble hollow organic fibers using a resin adhesive, it is not the case when such fibers are inorganic, by reason of the great fragility of the ceramics.

The solution to this problem is to shape membranes whose ceramic support is a monolith, such as, for example, that described in U.S. Pat. No. 4,069,157 and EP-A-470,340. In a monolith, it is possible to construct channels therethrough whose diameter can be similar in size to those of hollow fibers. Cf. U.S. Pat. No. 4,060,088.

Once it is intended to provide an inorganic membrane having the highest possible exchange surface area per unit of volume, normally determined taking account of a monolithic support therefor, said monolith must then exhibit the highest possible permeability factor (P.F.). P.F. satisfies the following equation:

$$P.F. = P.V. \times (S.V./S.A.) \quad (1)$$

in which P.V. is the porosity of the material; S.V. is the ratio of the volume of the material, excluding the perforations of the channels, to the total volume of the monolith, including the perforations; and S.A. is the specific surface of the perforations per unit of volume of the monolith.

In accordance especially with the U.S. Pat. No. 4,069,157 indicated above, and more particularly column 3, lines 43 to 57, the P.F. must be the highest possible and preferably greater than $10^{-4}$ $\mu$m.

In the above equation (1), it will be seen that S.V./S.A. is directly dependent on the geometry of the monolith. Consequently, for a given monolith geometry, the only possibility for increasing P.F. is therefore to increase P.V.

However, the best performing inorganic membranes and the most resistant are produced via a double sintering, on the one hand of the constituent ceramic material of the support and, on the other, of the constituent ceramic material of the membrane. These two sinterings can be carried out separately or simultaneously.

The longer the sintering and the higher the temperature at which sintering is carried out, the better the mechanical properties of the membrane but, also, the more the porosity decreases and the more the diameter of the pores increases. Moreover, it is known that when the pore volume of a sintered ceramic article increases, its mechanical strength decreases.

SUMMARY OF THE INVENTION

Accordingly, a major object of the present invention is the provision of a constituent ceramic material which can be shaped into a monolithic support and which can be sintered at a sufficiently low temperature to provide a monolith having a high porosity greater than 30%, preferably greater than 40% (measured using a mercury porosimeter) and whose mean equivalent pore diameter ranges from 1 to 20 $\mu$m, preferably from 5 to 15 $\mu$m.

Another object of the present invention is the provision of a monolithic support of the above type which is more particularly suitable for the fabrication of tangential microfiltration membranes and of tangential ultrafiltration membranes having a low pressure drop and a high permeability to water.

Yet another object of the present invention is the provision of a technique for rendering the ends of the supports leaktight (making them leaktight to the fluids to be treated).

Briefly, the present invention features a porous monolithic ceramic support for an inorganic filtration membrane, having a mean equivalent pore diameter Ds ranging from 1 to 20 $\mu$m, preferably from 5 to 15 $\mu$m, and a porosity greater than 40%, said support comprising a ceramic of alumina $Al_2O_3$ grains or particulates coated at least partially with grains or particulates of titanium $TiO_2$. The percentage by weight of titanium dioxide $TiO_2$ with respect to the total weight of $Al_2O_3$ and $TiO_2$ ranges from 1% to 75% and preferably from 20% to 50%.

DETAILED DESCRIPTION OF PREFERRED EMBODIMENTS OF THE INVENTION

More particularly according to the present invention, the alumina particulates advantageously have a particle size ranging from 3 to 500 $\mu$m, preferably from 10 to 100 $\mu$m, and even more preferably from 20 to 30 $\mu$m.

The TiO$_2$ particulates advantageously have a particle size ranging from 0.01 to 7 μm, preferably from 0.1 to 1 μm.

In a preferred embodiment of the invention, the alumina is an alumina of corundum type whose grains have a tubular shape and the percentage by weight of titanium dioxide TiO$_2$ with respect to the total weight of alumina and TiO$_2$ ranges from 20% to 40%.

Preferably, the alumina is essentially of corundum type and the titanium dioxide is essentially of rutile type.

The present invention also features a process for the production of porous supports, according to which a paste is formulated from a suitable mixture of TiO$_2$ and Al$_2$O$_3$ powder, conventional adjuvants such as a binder, plasticizer, lubricating agent, deflocculating agent, wetting agent, water retention agent, antifoaming agent, antistatic agent, chelating agent and bactericide, and water.

The water content of the paste, for purpose of attaining a malleable state, generally ranges from 15% to 25%. In a preferred embodiment of the process of the invention, the alumina powder is first mixed with, optionally, a small fraction of the TiO$_2$ powder, for example less than 20% by weight, and the water is introduced in the form of a slip containing the remainder or all of the TiO$_2$ powder, this slip, before mixing, having been deflocculated beforehand by a known deflocculation means such as a Ph change, or the addition of a deflocculation agent.

This specific process for introducing water and TiO$_2$ into the paste permits coating each alumina grain with a film of TiO$_2$ grains.

As TiO$_2$ has a melting point much lower than that of alumina, this specific distribution of TiO$_2$ enveloping alumina grains makes it possible for the TiO$_2$ to completely melt during the heat treatment of the constituent paste of the support.

This paste, after having been kneaded and optionally permitted to age for a few days, is extruded under pressure and the raw or green monoliths thus obtained are dried at room temperature and then calcined and sintered.

The sintering temperature advantageously ranges from 1,000° to 1,500° C., preferably from 1,200° to 1,300° C.

The temperature is increased, for example, by 2° C./min to 200° C. and then by 4° C./min to the higher temperature selected for heat treatment.

It was observed, however, that there is formed, from approximately 1,280° C. by reaction between the alumina and the titanium dioxide, another definite compound designated tialite and having the formula Al$_2$TiO$_5$. The appearance of tialite causes the appearance of microfissures and results in the production of an undesirable support of extreme fragility.

Consequently, it is recommended that the sintering be carried out at a maximum temperature of 1,275° C.

The present invention also features inorganic filtration membranes, more particularly microfiltration and ultrafiltration membranes exhibiting high permeability to water and to air, prepared from the supports described above.

The present invention accordingly features inorganic microfiltration membranes, comprising:

(a) a multichannel monolithic support as described above, and (b) a separating membrane filtration layer situated at the surface of the channels, comprising sintered metal oxide particles having a mean equivalent diameter Do, before sintering, ranging from 0.1 to 3 μm according to a ratio:

0.3 < Ds/Do < 200, preferably 1 < Ds/Do < 150, said layer not substantially extending inside the pore volume or porosity of the support and having a mean equivalent pore diameter Dm ranging from 0.05 to 1.5 μm.

The metal oxides which can thus be used are preferably the oxides of metals of Groups IIa, IIIb, IVb, Vb, VIb, VIIb, VIII, Ib, IIb, IIIa and IVa of the Periodic Table of the Elements (cf. *Handbook of Chemistry and Physics*, 53rd Edition).

The metal of the metal oxide, in particular, advantageously is selected from among beryllium, magnesium, calcium, aluminum, titanium, strontium, yttrium, lanthanum, zirconium, hafnium, thorium, iron, manganese, silicon and the various possible mixtures thereof. However, the preferred oxide is titanium oxide, alumina or zirconia, which can additionally contain a structural stabilization metal selected from among yttrium, calcium, magnesium and a rare earth metal, as well as mixtures thereof.

The membrane layer of metal oxides is deposited onto the support by the known technique designated slip painting ("slip casting"), according to which a slip of the metal oxide is generally deposited onto the support followed by a suitable sintering.

The sintered membrane layer preferably has a thickness ranging from 5 to 50 μm.

As is apparent, the sintering temperature must be compatible with the maximum sintering temperature of the support.

Thus, in a preferred embodiment of the corundum and rutile support, preferably a membrane layer based on titanium dioxide is employed whose sintering temperature is less than 1,275° C. In another significant embodiment of the invention, the microfiltration membrane layer must not substantially penetrate within the volume of the support.

Indeed, the interpenetration of the membrane layer into the support is advantageously less than 2 μm, preferably less than 0.5 μm.

There exist various known techniques to attain the aforesaid result. One of the simplest entails, before the slip painting, in filling the porosity or pore volume of the support with an organic binder which decomposes during sintering (fugitive binder), such as for example a melamine/formaldehyde resin.

It is also possible to block the orifices of the pores of the support by means of very fine powders of materials which can be eliminated by combustion in air, such as for example carbon black.

The microfiltration membranes according to the invention, more particularly in the event that the support is a mixture of alumina and of titanium dioxide and the membrane is shaped from TiO$_2$, are especially mechanically strong and robust, have a low pressure drop and a particularly high permeability to water (which can exceed 3,000 l/h/m$^2$/bar for a membrane whose mean pore diameter is 0.2 μm and for a support having a porosity of 45% for a mean pore diameter of 6 μm).

The present invention also features ultrafiltration membranes produced from an inorganic microfiltration membrane as described above and having a high permeability to water and to air.

The present invention thus features ultrafiltration membranes, comprising:
(i) an inorganic microfiltration membrane, as described above, and
(ii) an ultrafiltration separating membrane layer which comprises sintered metal oxide particles whose equivalent diameter, before sintering Du, ranges from 2 to 100 nm and according to a ratio:

$$0.5 < Dm/Du < 750$$

said ultrafiltration membrane layer being situated on the microfiltration membrane layer and not substantially penetrating within the latter.

The sintered metal oxide particles are obtained either with an oxide and a process for depositing the layer analogous to those employed for the microfiltration layer (only the particle size changes), or by heat treatment of particles of hydrated oxides obtained by a process of sol/gel type and deposited by the slip painting technique.

The ultrafiltration membrane according to the invention is particularly strong and robust and has a low pressure drop and a high permeability to water which can exceed 500 1/h/m²/bar for a membrane whose pore diameter is on the order of 20 nm, that of the intermediate microfiltration membrane of 0.2 μm and that of the support of 5 μm for a porosity of 45%.

The membranes according to the invention having high permeability to water and having low pressure drop are most particularly attractive for the filtration of liquids which have little ability to blind or clog the membranes.

Thus, the microfiltration membranes according to the invention are particularly suited for the production of ultrapure water for electronics, to rendering waters potable, especially from underground waters, to the sterile filtration and to the clarification of wine, of cider, of vinegar and of fruit juices and to the production of sterile fluids for medical use (hospitals), to the production of bottled table water (removal of iron and bacteria, and the like). The ultrafiltration membranes are particularly suited for the production of sterile (purified of bacteria) and apyrogenic water for the chemical and pharmaceutical industries, to the recovery of proteins in agricultural produce effluents, to the treatment of effluents from the papermaking and sugar-producing industries, to lowering the chemical oxygen demand in waste waters, to the concentration of milk and its derivatives, and the like.

The present invention also features a monolithic support having a filtration membrane consolidated therewith, and the ends of which support being leaktight, namely, rendered leaktight to liquids to be treated. The ends to be made leaktight are situated at the two ends of the support at the junction between the membrane layer and the part of the support which encounters the liquid to be treated which is transferred through the membrane. The parts to be made leaktight are thus, indeed, the entire surface of the two ends of the support which are not provided with a membrane layer.

In accordance with the invention, the ends of the supports or of the membranes are made leaktight by a thin film of a thermoplastic or thermofusible polymer.

Among the thermoplastic polymers, the preferred polymers are optionally grafted halogenated or perhalongenated polyolefins, in particular optionally grafted fluorinated and perfluorinated polyolefins such as FEP, TFE, PFA, ECTFE, ETFE and in particular Teflon ®.

The polymer film is deposited by any suitable known technique such as by coating with a polymer suspension, by an electrostatic process or by direct deposition by means of a fluidized bed of polymer powder followed by heat treatment.

The polymer layer advantageously has a thickness ranging from 10 to 500 μm, preferably from 100 to 200 μm.

Unexpectedly, it was observed according to the invention that the thermoplastic or thermofusible polymers adhere perfectly to the surface of the support and mask all of the porosity. Additionally, in the event that a fluorinated polyolefin is used, the polymer layer does not, in practice, reduce the thermal and chemical stability of the support.

In order to further illustrate the present invention and the advantages thereof, the following specific example is given, it being understood that same is intended only as illustrative and in nowise limitative.

In said example to follow, all parts and percentages are given by weight, unless otherwise indicated.

EXAMPLE (A) Preparation of the ceramic paste and the monolith in the raw state:

The following materials were mixed in a Lodige M20 ® mixer for 10 minutes:
(i) 48% by weight of corundum having a mean particle size of 25 μm,
(ii) 3.4% of a binder based on a starch derivative,
(iii) 3.4% of a plasticizing binder which was a cellulose binder containing methyl and hydroxypropyl groups along the polymer chain,
(iv) 0.2% of a processing agent which was in aqueous emulsion with a nonionic surfactant.

A deflocculated rutile slip was then added, i.e.:
(a) 20.5% of rutile $TiO_2$ having a particle size of 0.2 μm, and
(b) 24.5% of water.

The paste thus obtained was transferred to a Hobart ® A 200 mixer and kneaded for 4 hours.

The paste obtained was then permitted to age for 4 days and was then extruded under a pressure of 15 bars as a monolith of tubular geometry having a diameter of 20 mm traversed by 7 cylindrical channels having a diameter of 4 mm, one of which was at the center and the 6 others at the periphery. The monolith had a length of 95 cm. The monoliths were dried for 3 days on rotating rollers which effected an even removal of water.

(B) Calcination of the raw monoliths:

The raw monoliths were introduced into an electric furnace where they were subjected to a first temperature increase up to 200° C. at a rate of 2° C./min, were maintained at 200° C. for 1 h, then heated from 200° C. to 1,275° C. at a rate of 4° C./min and were maintained at this temperature for 15 h.

The monoliths thus obtained had the following characteristics:
(1) Resistance to bursting: 60 bars,
(2) Porosity: 43%,
(3) Mean pore diameter: 6 μm and 90% of the pore volume ranged from 2 to 15 μm.

A monolith immersed for 150 hours in a sodium hydroxide bath (0.5N) at 80° C. did not experience any weight loss and was not chemically attacked.

(C) Deposition of a microfiltration membrane layer:

First, the inside or interior of the monolith was coated, by filling and then emptying, by means of a melamine/formaldehyde resin which would maintain the membrane layer at the surface after elimination during sintering.

A $TiO_2$ slip was then prepared, having the following composition by weight:

(i) $TiO_2$: 6%,
(ii) organic binder: 20%,
(iii) $H_2O$: 74%.

The $TiO_2$ was rutile and marketed by Titafrance under the trademark Rex ®.

The mean diameter of the particles was 0.4 μm.
The binder was Carbopol ® 934.
The slip was prepared in the following manner:

(a) $TiO_2$ was suspended with mechanical stirring in water containing the dispersing agent,
(b) the suspension was homogenized and sieved,
(c) the organic binder was added,
(d) sieving was carried out again and the channels of the support were coated by the slip painting technique. The coating was dried for 3 hours at 80° C. and the deposit was sintered in an electric furnace.

The support and the deposit were first heated to 250° C. for 1 h, this temperature having been attained at the rate of 2° C./min, and then the deposit was sintered at 1,025° C. for 3 hours, this temperature having been attained at the rate of 5° C./min.

A membrane was obtained having a thickness of 25 μm which did not substantially penetrate within the support, the equivalent pore diameter of which was 0.2 μm and which had a permeability to water of 3,400 1/h/m²/bar.

(D) Deposition of an ultrafiltration membrane layer:

Exactly the same operations as in (C) above were carried out, except that the $TiO_2$ powder had a particle size of 50 nm. After sintering, an ultrafiltration membrane having a thickness of 2 μm was obtained which did not substantially penetrate within the microfiltration layer and whose mean equivalent pore diameter was 20 nm and which had a permeability to water of 550 1/h/m²/bar.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A porous monolithic ceramic support having a mean equivalent pore diameter Ds ranging from 1 to 20 μm and a pore volume greater than 30%, comprising ceramic alumina particulates at least partially coated with $TiO_2$ particles, and wherein the percentage by weight of $TiO_2$, with respect to the total weight of $Al_2O_3$ plus $TiO_2$, ranges from 1% to 75%, the $TiO_2$ being present in an amount which allows high porosity to be maintained in the support when the support is sintered at low sintering temperatures.

2. The porous monolithic ceramic support as defined by claim 1, said ceramic alumina particulates having a mean particle size ranging 3 to 500 μm.

3. The porous monolithic ceramic support as defined by claim 2, said $TiO_2$ particles having a mean particle size ranging from 0.01 to 7 μm.

4. The porous monolithic ceramic support as defined by claim 2, said $TiO_2$ particles having a mean particle size ranging from 0.1 to 7 μm.

5. The porous monolithic ceramic support as defined by claim 1, comprising corundum alumina particulates and rutile $TiO_2$ particles.

6. The porous monolithic ceramic support as defined by claim 1, having a pore volume greater than 40%.

7. The porous monolithic ceramic support as defined by claim 1, having a mean equivalent pore diameter Ds ranging from 5 to 15 μm.

8. The porous monolithic ceramic support as defined by claim 1, having been sintered at a temperature above 1,000° C.

9. The porous monolithic ceramic support as defined by claim 8, having been sintered at a temperature no greater than 1,275° C.

10. A process for the production of the porous monolithic ceramic support as defined by claim 9, comprising formulating a paste of said ceramic alumina particulates and said $TiO_2$ particles, homogenizing and drying such paste, and then extruding, calcining and sintering the dried material.

11. The process as defined by claim 10, said paste further comprising water and at least one binder, plasticizer, lubricant, deflocculant, wetting agent, water retention agent, antifoaming agent, antistatic agent, chelating agent and/or bactericide.

12. The process as defined by claim 10, wherein the sintering is carried out at a temperature low enough to avoid formation of tialite in the form of $Al_2TiO_5$.

13. An extruded shaped article comprising the porous monolithic ceramic support as defined by claim 1.

14. A composite inorganic filtration device, comprising the porous monolithic ceramic support as defined by claim 1, and said ceramic support having a metal oxide filtration membrane securedly deposited onto porous face surface thereof.

15. The composite inorganic filtration device as defined by claim 14, said metal oxide filtration membrane essentially not penetrating into the pore volume of said ceramic support.

16. A composite inorganic microfiltration device, comprising that defined by claim 15 wherein said metal oxide filtration membrane comprises sintered particulates having a mean equivalent diameter Do, prior to sintering, ranging from 0.1 to 3 μm according to the ratio:

$$0.3 < Ds/Do < 200$$

and having a mean equivalent pore diameter Dm ranging from 0.05 to 1.5 μm.

17. A composite inorganic ultrafiltration device, comprising that defined by claim 16 wherein said metal oxide microfiltration membrane has a metal oxide ultrafiltration membrane securedly deposited onto the external face surface thereof.

18. The composite inorganic ultrafiltration device as defined by claim 17, said metal oxide ultrafiltration membrane comprising sintered particulates having an equivalent diameter Du, prior to sintering, ranging from 2 to 100 nm according to the ratio:

$$0.5 < Dm/Du < 750$$

and said metal oxide ultrafiltration membrane essentially not penetrating into the pore volume of said microfiltration membrane.

19. The composite inorganic ultrafiltration device as defined by claim 17, having proximal and distal leaktight ends.

20. The composite inorganic microfiltration device as defined by claim 16, having proximal and distal leaktight ends.

21. The composite inorganic microfiltration device as defined by claim 20, said leaktight ends comprising a thin coating of a fluorinated or perfluorinated polyolefin.

22. The porous monolithic ceramic support of claim 14, wherein the metal oxide filtration membrane consists essentially of $TiO_2$.

23. The porous monolithic ceramic support of claim 1, wherein the support is free of tialite in the form of $Al_2TiO_5$.

24. The porous monolithic ceramic support if claim 1, wherein the percentage by weight of $TiO_2$, with respect to the total weight of $Al_2O_3$ plus $TiO_2$, ranges from 20% to 75%.

25. The porous monolithic ceramic support of claim 1, having been sintered and the $TiO^2$ comprising a melted coating which envelops the alumina particulates.

26. A porous monolithic ceramic support having a mean equivalent pore diameter Ds ranging from 1 to 20 $\mu$m and a pore volume greater than 30%, comprising ceramic alumina particulates at least partially coated with $TiO_2$ particles, and wherein tile percentage by weight of $TiO_2$, with respect to the total weight of $Al_2O_3$ plus $TiO_2$, ranges from 20% to 50%, said ceramic alumina particulates having a mean particle size ranging from 10 to 100 $\mu$m and said $TiO_2$ particles having a mean particle size ranging from 0.1 to 1 $\mu$m.

* * * * *